Jan. 27, 1925.
J. R. LOWREY
HOSE COUPLING
Filed May 17, 1921
1,524,361
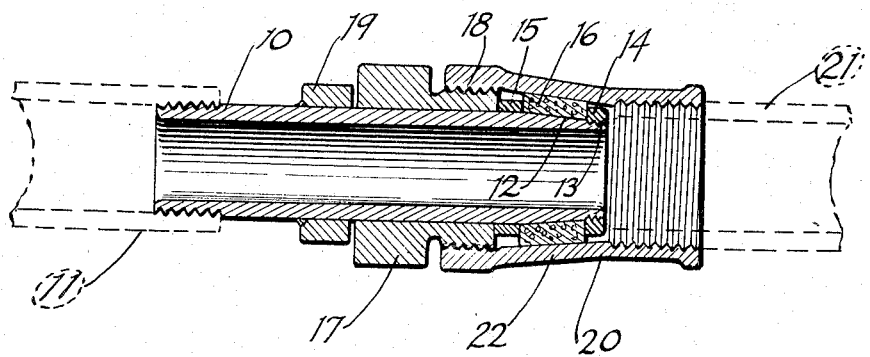
Inventor:
JOHN R. LOWREY
Hazard & Miller
Attorneys.

Patented Jan. 27, 1925.

1,524,361

UNITED STATES PATENT OFFICE.

JOHN R. LOWREY, OF SAN PEDRO, CALIFORNIA.

HOSE COUPLING.

Application filed May 17, 1921. Serial No. 470,275.

*To all whom it may concern:*

Be it known that I, JOHN R. LOWREY, a citizen of the United States, residing at San Pedro, in the county of Los Angeles and State of California, have invented new and useful Improvements in Hose Couplings, of which the following is a specification.

My invention relates to new and useful improvements in couplings of the type adaptable for use in connecting all kinds of hose, tubes or pipes, the principal objects of my invention being to generally improve upon and simplify the construction of the existing types of hose and pipe couplings, to provide a device that is relatively simple in structure, capable of being easily and cheaply produced and constructed so that it may be readily assembled or taken apart, to provide a device that can be easily connected or disconnected and producing a fluid tight joint when properly connected, and, further, to provide a coupling that will be very effective in performing its intended functions.

With the foregoing and other objects in view, my invention consists in certain novel features of construction and arrangement of parts that will be hereinafter more fully described and claimed, and illustrated in the accompanying drawings, in which—

The figure is a section taken lengthwise through the center of a coupling of my improved construction.

Referring by numerals to the accompanying drawings, 10 designates a tubular member to one end of which may be connected a hose or pipe such as 11 and the opposite end of said tube section being externally tapered toward its outer end as designated by 12, and the extreme outer end of said tapered portion being threaded as designated by 13 in order to receive an internally threaded ring or collar, 14.

Welded or shrunk on to the tubular member 10 at the inner end of the tapered portion 12, is a collar 15 and arranged on the tapered portion of said tube and disposed between the collars 14 and 15, is a packing member or gasket 16 of rubber, leather or analogous compressible material.

Arranged to rotate freely upon the body of tubular member 10, immediately to the rear of collar 15, is a sleeve 17 having a reduced portion 18 that is externally threaded, and rigidly fixed in any suitable manner upon member 10 to the rear of this sleeve, is a retaining ring or collar 19.

The female member of the coupling comprises a sleeve 20 the outer end of which is adapted to be rigidly or otherwise connected in any suitable manner to a hose or tube such as 21 and the opposite end of said sleeve being internally threaded so as to receive the externally threaded member 18 of sleeve 17.

The intermediate portion 22 of sleeve 20 tapers slightly toward the outer end or the end that is connected to tubular member 21, and the internal tapered face of this portion 22 is adapted to bear directly upon the outer face of packing member or gasket 16. When the threaded member 18 is screwed into the end of the sleeve 22, the latter is drawn toward the sleeve 17, with the result that the packing member or gasket 16 is very tightly compressed without relative rotation between the tapered portions of the members 10 and 20, thereby producing a self-tightening fluid tight joint and consequently accomplishing the desired result.

The sleeve 17 being free to rotate between the collars 15 and 19, without unscrewing from sleeve 20, the connection between pipes 11 and 21 is practically a swiveled connection. When the packing member or gasket 16 becomes worn or unfit for service, it may be replaced by a new gasket by simply removing the ring or collar 14; but it will be obvious that the connection and disconnection of the parts referred to need involve only a compression of the packing 16, without rotation of contacting parts upon this packing; and that steam pressure upon the end of the packing must occasion such a transverse thickening thereof that the joint may be regarded as self-tightening.

A hose or pipe coupling of my improved construction is comparatively simple, may be easily and quickly connected or disconnected without rotation of pipe 11 relatively to pipe 21, and is very effective in providing a practically swiveled and self-tightening fluid tight connection between the ends of hose sections, pipes and the like.

It will be readily understood that minor changes in the size, form and construction of the various parts of my improved pipe coupling may be made and substituted for those herein shown and described without departing from the spirit of my invention, the scope of which is set forth in the appended claim.

I claim as my invention:

A hose coupling comprising a tubular member having an externally tapered end portion, a packing member on the tapered portion, a collar screw seated on the end of the tapered portion against the packing member, a second collar slidingly mounted on the tubular member against the packing member, an externally threaded sleeve loosely on the tubular member against the sliding collar, and an internally threaded and tapered sleeve enclosing the packing member and sliding collar and adapted to receive the externally threaded sleeve.

In testimony whereof I have signed my name to this specification.

JOHN R. LOWREY